3,206,508
PROCESS FOR PREPARING β-CHLORETHANE PHOSPHONIC ACID DICHLORIDE
Herbert Vilcsek, Hofheim, Taunus, Fritz Rochlitz, Frankfurt am Main, and Claus Heuck, Hofheim, Taunus, Germany, assignors to Farbwerke Hoechst Aktiengesellschaft, Frankfurt am Main, Germany, a corporation of Germany
No Drawing. Filed June 14, 1960, Ser. No. 35,876
Claims priority, application Germany, June 20, 1959, F 28,744; July 31, 1959, F 29,070; Feb. 16, 1960, F 30,546
6 Claims. (Cl. 260—543)

The present invention relates to a process for preparing β-chlorethane phosphonic acid dichloride.

It is known to prepare β-chlorethane phosphonic acid dichloride by reacting β-chlorethane phosphonic acid esters, preferably β-chlorethane phosphonic acid bis-β-chlorethyl ester, with phosphorus pentachloride. It is also known to prepare β-chlorethane phosphonic acid dichloride by decomposing a reaction product of ethylene chloride, phosphorus trichloride and stoichiometric amounts of aluminum chloride with the corresponding quantity of water.

The aforesaid processes have, however, considerable disadvantages which impair their industrial utilisation. The first-mentioned process is, for example, uneconomic for in a process comprising several stages 2 mols of ethylene oxide are separated in the form of the β-chlorethoxy group with the consumption of 2 mols of phosphorus pentachloride from the β-chlorethane phosphonic acid bis-β-chlorethyl ester for the preparation of which 3 mols of ethylene oxide and 1 mol of phosphorus trichloride are used and, moreover, the final yield amounts to no more than about 10%. In the other process that has been mentioned above the working up entails considerable technical difficulties which are due to the use of stoichiometric quantities of aluminum chloride.

It is also known to prepare β-chlorethane phosphonic acid dichloride by simultaneously introducing oxygen and ethylene into phosphorus trichloride, the β-chlorethane phosphonic acid dichloride being obtained in very poor yields of less than 5% [cf. L. S. Soborowskij, "Dokl. Akad. Nauk S.S.S.R. 67 (1949), dealt with in "Chemical Abstracts," vol. 44, pages 1401 to 1402, 1950].

We have now found that β-chlorethane phosphonic acid dichloride can be prepared from ethylene, phosphorus trichloride and oxygen according to the equation

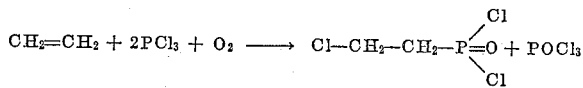

in one stage of reaction, in a very economic way and with very good yields if the ethylene is used in a high concentration. In general more than 0.2 mol of ethylene should be used per 1 mol of phosphorus trichloride. Advantageously the ethylene is used in such concentrations that 0.3 to 20 mols of ethylene are used per 1 mol of phosphorus trichloride.

The required concentration of ethylene can be brought about in various ways. One way is to introduce oxygen into a mixture of liquid ethylene and phosphorus trichloride. Another possibility is to carry out the reaction in a medium that is inert or substantially inert with respect to the reactants and which is at the same time a very good solvent for ethylene and consequently enables the preparation of ethylene solutions of high concentration. A third possibility is to carry out the reaction under pressure which also enables a high concentration of the ethylene to be attained. Owing to these three possibilities the process can be carried out in three different ways and, if desired, the features of the different variations of the process can be combined with one another.

In the reaction according to the invention oxygen may be used in pure form or in the form of oxygen-containing gases, for example, air or air enriched with oxygen. In some cases it may be advantageous to use simultaneously substances which under the reaction conditions yield oxygen.

In the mode of operating according to the present invention in which a mixture of phosphorus trichloride and liquid ethylene is used the phosphorus trichloride is advantageously dissolved in liquid ethylene and a constant, finely divided current of air or oxygen is introduced into the solution thus obtained. The fine dispersion of the gases is brought about in known manner, advantageously by passing the gases through a porous plate, by the use of fillers or by intense stirring.

Preferably 3 to 15 mols of ethylene are used per 1 mol of phosphorus trichloride.

The reaction may, for example, be carried out in an open, well insulated vessel. Alternatively, it may be carried out in a closed vessel and with reflux. The reaction temperature may vary within wide limits, namely within the range limited by the melting point of ethylene and the boiling point of the solution of the phosphorus trichloride in ethylene. When the reaction is carried out under atmospheric pressure the temperature is advantageously within the range of −140° to −100° C. Because of the losses of cold occurring during the reaction means has to be provided for a sufficient insulation and cooling.

The reaction sets in immediately after the commencement of the introduction of oxygen or air. It is possible to let the reaction proceed until the phosphorus trichloride is consumed. The ethylene that has not undergone conversion can be recovered entirely and be re-used for the reaction without being purified. Alternatively, a further quantity of phosphorus trichloride may be added in the course of the reaction, so that the ethylene can be completely consumed.

In certain cases it is also possible to interrupt the reaction before the phosphorus trichloride originally introduced is consumed.

According to the second modification of the process of the present invention it is of advantage to introduce oxygen or gases containing oxygen and gaseous ethylene into a solution of phosphorus trichloride and a solvent which is inert or practically inert with respect to phosphorus trichloride, ethylene and oxygen and which is a good solvent both for phosphorus trichloride and ethylene.

Particularly suitable solvents are halogenated hydrocarbons, for example, methyl chloride, ethyl chloride, methylene chloride, carbon tetrachloride or chloroform, esters of carboxylic acids, for example, formic acid methyl ester or acetic acid methyl ester, or inorganic solvents, for example, phosphorus oxychloride. Mixtures of solvents, for example, a mixture of ethyl chloride and phosphorus oxychloride or of methyl chloride and carbon disulfide, may also be used.

In the aforesaid modification of the process of the invention the reaction may be carried out under atmospheric pressure or under reduced pressure. The reaction temperatures are advantageously within the range of −100° to 0° C. and preferably within the range of −100° to −25° C.

The ratio of solvent to phosphorus trichloride may vary within wide limits. It is, however, suitable to choose such a ratio that 0.5 to 20, preferably 1 to 15, parts by weight of solvent are used per 1 part by weight of the phosphorus trichloride.

When operating in this way it is also suitable to take care that oxygen and ethylene are divided as finely as possible in the reaction mixture. Such a fine distribution can be brought about by stirring or by another kind of mechanical mixing, for example, by introducing the gases into the reaction chamber through fine nozzles, porous plates, Raschig rings or other suitable mechanical devices. The gases may be introduced separately into the mixture of ethyl chloride and phosphorus trichloride. It is, however, more advantageous first to mix ethylene and oxygen and then to introduce the resulting mixture into the reaction mixture through a common fine-pored glass frit.

Although the two modes of carrying out the process of the invention which have been described constitute a great advance in the art as compared with the known experiment of L. S. Soborowskij since they enable the yield of β-chlorethane phosphonic acid dichloride to be increased by about 60 to 85%, they entail comparatively high expenditure on plant, which is especially due to the fact that the processes have to be carried out at relatively low temperatures which are in general below −25° C. In order to render the process even more economic it is of particular advantage to carry it out according to the third of the above-mentioned modifications, in which the application of pressure enables the reaction to be carried out at temperatures about 0° C., for example, at room temperature or even at higher temperatures. When the reaction is carried out in this manner β-chlorethane phosphonic acid dichloride is obtained from oxygen or oxygen-containing gases, phosphorus trichloride and ethylene in yields which, calculated on the ethylene that has undergone reaction, are almost quantitative.

The third modification of the present process is realized in the following way: Phosphorus trichloride is saturated in a suitable pressure vessel, for example, an autoclave or a tube, with ethylene under a certain pressure which is above atmospheric pressure and at a certain temperature and then oxygen or oxygen-containing gases are introduced into the mixture of phosphorus trichloride and ethylene thus obtained. It is of advantage to mix not only the mixture of phosphorus trichloride and ethylene but above all the reaction mixture intimately, especially during and after the introduction of oxygen. The intimate mixing may be brought about, for example, by stirring or shaking. The pressure applied in the process of the invention is preferably within the range of about 15 to about 150 atmospheres. However, the reaction can also be carried out under pressures within the range of 15 atmospheres down to nearly atmospheric pressure and under pressures of more than 150 atmospheres.

In this modification of the process, the β-chlorethane phosphonic acid dichloride is generally prepared at temperatures above 0° C., preferably at temperatures within the range of 0° to +120° C. This does, however, not exclude the possibility of carrying out the reaction at temperatures above or below the aforesaid range, provided they are above the boiling point of the ethylene under normal pressure.

It is, of course, also possible to carry out the last-mentioned variation of the process in the presence of diluents that are inert with respect to the reaction, for example, ethyl chloride or phosphorus oxychloride. The reaction product itself is also very suitable as a diluent which is inert with respect to the reaction. The process is not limited to the use of oxygen or oxygen-containing gas mixtures. There may also be used substances which under the reaction conditions yield oxygen. These substances may be used either alone or concomitantly. As substances yielding oxygen there may be used with particular advantage all compounds that are capable of yielding oxygen at the temperatures at which the reaction is carried out. For the third modification of the process of the invention there may, if desired, also be used solid or liquid adsorption compounds of oxygen with suitable adsorption agents.

The oxygen or oxygen-containing gas may be introduced continuously through one or more conduits or it may be introduced discontinuously in portions. When operating discontinuously care has, however, to be taken that the oxygen is introduced in several smaller successive portions. This measure serves above all to prevent the reaction from taking too violent a course. It is suitable to introduce fresh oxygen into the reaction mixture only after the previously introduced quantity of oxygen has been consumed by the reaction.

In all these modifications of the process of the invention it is possible to use catalysts or mixtures of catalysts, in particular such as are capable of forming complexes and/or of carrying oxygen into the ethylene or into the phosphorus trichloride.

The degree of conversion and the yield of β-chlorethane phosphonic acid dichloride may furthermore be increased by the presence of sparingly soluble particles having large surfaces such as active carbon or calcium phosphate, preferably by the presence of polymer compounds such as polyethylene, polypropylene or polystyrene. These compounds may be present, for example, in a quantity of up to 5% by weight, calculated on the phosphorus trichloride.

Independently of the mode of carrying out the process of the invention, the reaction sets in with the formation of heat immediately on the addition of oxygen or oxygen-containing gas mixtures and/or substances yielding oxygen to the mixture of phosphorus trichloride and ethylene which may contain a diluent that is inert with respect to the reaction. It is, however, necessary to mix the gaseous phase intimately with the liquid phase. The mixing may be brought about, for example, by stirring, shaking or a similar measure. Depending on the total quantity of oxygen introduced the reaction may be continued until the phosphorus trichloride used is completely consumed.

The process according to the invention is particularly suitable for operating continuously. In some cases it is of technical interest to carry out the reaction discontinuously.

After the reaction is terminated and, if the process has been carried out under pressure, after expansion and after the excess of the gaseous ethylene which has not been consumed in the course of the reaction has been separated—if the reaction is carried out continuously the ethylene is suitably continuously returned to the reaction—a liquid phase is obtained as crude reaction product which besides β-chlorethane phosphonic acid dichloride and phosphorus oxy-chloride may contain varying portions of unconsumed phosphorus trichloride. If the reaction is carried out in the presence of diluents the aforesaid liquid phase contains the diluents, too. The portion of phosphorus trichloride contained in the liquid phase is determined by the quantity of oxygen which has been reacted with the mixture of phosphorus trichloride and ethylene. If more than 0.5 mol of oxygen is reacted per 1 mol of phosphorus trichloride the crude reaction product does not contain phosphorus trichloride.

The crude reaction product which is obtained is worked up in the following way: If liquid ethylene and phosphorus trichloride which have not undergone conversion are present these substances are eliminated and then the phosphorus oxychloride that has also formed during the reaction is distilled off under normal or reduced pressure. The final product is then distilled under normal, or preferably, reduced pressure.

Owing to its reactive groups β-chlorethane phosphonic acid dichloride is an intermediate product which can be used for various chemical syntheses, for example, for the preparation of esters, amides and the like. Due to their content of phosphorus, compounds of this kind have become important in various fields of application. Since they have a fungicidal effect many of them can be used as pesticides. Others of these compounds can be used for the manufacture of plant protective agents. β-chlorethane phosphonic acid dichloride is suitable for the preparation of difficultly inflammable polyesters. By the splitting off of hydrogen chloride it is converted into vinyl phosphonic acid dichloride which owing to its double bond can be polymerized and copolymerized.

The process of the invention is illustrated by the results of experiments given below. First the statement made by Soborowskij in "Dokl. Akad. Nauk. S.S.S.R. 67" was checked by the following experiment:

A four-necked flask having a capacity of 2 liters and provided with stirring means, thermometer and inlet tubes for ethylene and oxygen was charged with 500 grams of phosphorus trichloride and then 60 liters of ethylene and 30 liters of oxygen were introduced per hour at −20° C. After 5 hours of reaction small portions of unreacted phosphorus trichloride and the phosphorus oxychloride that had formed were distilled and then the remaining residue was distilled under reduced pressure. 20 grams of β-chlorethane phosphonic acid dichloride were obtained, which corresponds to a yield of 4%, the percentage being calculated on the phosphorus trichloride used as starting material.

A comparison of this experiment with the experiments described in Examples 1 to 6 given below shows that the use of ethylene in higher concentrations according to the process of the present invention enables β-chlorethane phosphonic acid dichloride to be obtained in yields which amount to a multiple of the yield obtained by the process of Soborowskij.

The following examples serve to illustrate the invention but they are not intended to limit it thereto.

Example 1

Gaseous oxygen was passed for 4 hours through a solution of 236 grams of phosphorus trichloride (1.73 mols) in 600 grams of liquid ethylene (21.4 mols) at the temperature of the boiling solution. When the supply of oxygen was complete the ethylene that had not been consumed was eliminated by distillation and the remaining residue which at room temperature was a colorless or slightly brown yellow liquid was fractionated.

By a distillation under normal pressure 81 grams of phosphorus trichloride which had not undergone conversion were recovered from the residue and subsequently 105 grams of phosphorus oxy-chloride were distilled off. The crude β-chlorethane phosphonic acid dichloride remaining behind was distilled in vacuo under a pressure of 40 mm. of mercury and at a boiling point of 120° to 130° C. 84 grams of pure β-chlorethane phosphonic acid dichloride were obtained, which corresponds to 81.6% of the theoretical yield, the percentage being calculated on the reacted phosphorus trichloride. Under a pressure of 5.5 mm. of mercury the product had a boiling point of 82° to 84° C.

Example 2

3.9 kilograms of ethyl chloride were introduced into a four-necked flask having a capacity of 6 liters and provided with stirring device, refrigerator and thermometer. Then ethylene was introduced for 1½ hours. After this time 1780 grams of phosphorus trichloride were added and at −70° C. oxygen and ethylene were introduced into the reaction mixture, the oxygen being introduced at a rate of 30 liters per hour and the ethylene being introduced at a rate of 50 liters per hour. After 10 hours ethyl chloride, unreacted phosphorus trichloride (570 grams) and phosphorus oxychloride (904 grams) were distilled off under normal pressure. Subsequently β-chlorethane phosphonic acid dichloride was distilled in vacuo under a pressure of 5.5 mm. of mercury at a temperature of 85° to 86° C. The yield amounted to 517 grams of β-chlorethane phosphonic acid dichloride which corresponds to 65% of the theoretical yield, the percentage being calculated on the reacted phosphorus trichloride.

Example 3

3.9 kilograms of ethyl chloride and 500 grams of phosphorus oxychloride were introduced into the apparatus described in Example 1. After gaseous ethylene had been introduced for 1½ hours 1370 grams of phosphorus trichloride were added. At −70° C. a further quantity of ethylene and oxygen was introduced, the ethylene being supplied at a rate of 60 liters per hour and the oxygen at a rate of 35 liters per hour. After 12 hours ethyl chloride, phosphorus trichloride (540 grams) and phosphorus oxychloride (562 grams) were drawn off. Subsequently β-chlorethane phosphonic acid dichloride was distilled in vacuo under a pressure of 5 mm. of mercury at a temperature of 84° C. The yield was 428 grams of β-chlorethane phosphonic acid dichloride which corresponds to 78% of the theoretical yield, the percentage being calculated on the phosphorus trichloride that had reacted.

Example 4

20 grams of polyethylene were added to a solution of 3.9 kilograms of ethyl chloride and 1780 grams of phosphorus trichloride. Then ethylene and oxygen were introduced at −70° C., the ethylene being introduced at a rate of 50 liters per hour and the oxygen at a rate of 30 liters per hour. After 10 hours ethyl chloride, phosphorus trichloride (440 grams) and phosphorus oxychloride (1001 grams) were drawn off. By the subsequent distillation in vacuo, 570 grams of β-chlorethane phosphonic acid dichloride were obtained, which corresponds to 66% of the theoretical yield, the percentage being calculated on the phosphorus trichloride which had been reacted. The yield was approximately equal to that obtained in Example 1 but the degree of conversion was higher.

Example 5

Ethylene was introduced for 2 hours into 4 kilograms of methylene chloride. Then 1780 grams of phosphorus trichloride were added and at −70° C. ethylene and oxygen were introduced into the reaction mixture, the ethylene being introduced at a rate of 50 liters per hour and the oxygen at a rate of 25 liters per hour. After 10 hours the methylene chloride, the unreacted phosphorus trichloride and the phosphorus oxychloride that had formed during the reaction were distilled off. The residue was distilled in vacuo under a pressure of 5 mm. of mercury at 84° C. The distillation yielded 512 grams of pure β-chlorethane phosphonic acid dichloride.

Example 6

Ethylene was introduced for 1½ hours into 3 kilograms of methyl acetate. 1370 grams of phosphorus trichloride were added and for 10 hours ethylene and oxygen were introduced at −70° C. The mixture was stirred at a speed of 350 to 400 r.p.m.. Unreacted methyl acetate, phosphorus trichloride and phosphorus oxychloride that had formed during the reaction were then distilled off. Finally β-chlorethane phosphonic acid dichloride was distilled at 88° C. under a pressure of 6 mm. of mercury. 208 grams were obtained which corresponds to 41% of the theoretical yield.

Example 7

1574 grams (about 11.4 mols) of phosphorus trichloride were placed into an autoclave of a capacity of 5 liters and the air was evacuated by scavenging with ethylene. Then ethylene was introduced under pressure at 20° C., while stirring, until a constant pressure of 40 atmospheres had established. A total quantity of 120 liters (measured at S.T.P.) of oxygen was introduced into the autoclave, for example, via a pressed gas lock, in portions of about 20 liters (at S.T.P.). Each time after a portion of oxygen had been introduced a vivid reaction set in immediately which was terminated, however, after a short time. A quantity of oxygen which was introduced after a total quantity of oxygen of 120 liters (at S.T.P.) had already been introduced did not bring about any further reaction but showed that the reaction was complete.

After the autoclave had been relieved from pressure a slightly yellow liquid was obtained as crude reaction product from which 940 grams of phosphorus oxychloride could be separated by distillation. The further distillation of the remaining higher boiling residue yielded 701 grams of β-chlorethane phosphonic acid dichloride having a boiling point of 82° to 84° C. under a pressure of 5.5 mm. of mercury.

We claim:

1. A process for preparing β-chlorethane phosphonic acid dichloride which comprises introducing oxygen into a solution of phosphorus trichloride in liquid ethylene, the ethylene being present in a concentration of at least 0.3 and up to about 20 mols ethylene per mol of phosphorus trichloride.

2. A process for preparing β-chlorethane phosphonic acid dichloride which comprises intimately mixing oxygen with a solution of phosphorus trichloride and ethylene, the ethylene being present in a concentration of at least 0.3 and up to about 20 mols ethylene per mol of phosphorus trichloride.

3. A process for preparing β-chlorethane phosphonic acid dichloride which comprises intimately mixing oxygen with a solution of phosphorus trichloride and ethylene, the ethylene being present in a concentration of at least 0.3 and up to about 20 mols ethylene per mol of phosphorus trichloride and the solution being maintained under superatmospheric pressure and at a temperature above the boiling point of ethylene under normal pressure.

4. A process as claimed in claim 3 wherein the reaction is carried out at temperatures within the range of 0° to +120° C.

5. A process as claimed in claim 3 wherein the reaction is carried out under pressures within the range of 15 to 150 atmospheres.

6. A process for preparing β-chlorethane phosphonic acid dichloride which comprises intimately mixing oxygen with a solution of phosphorus trichloride and ethylene, the ethylene being present in a concentration of at least 0.3 and up to about 20 mols ethylene per mol of phosphorus trichloride, said solution also containing up to 5% by weight, calculated on the phosphorus trichloride, of sparingly soluble particles.

References Cited by the Examiner

UNITED STATES PATENTS

| | | | |
|---|---|---|---|
| 2,683,168 | 7/54 | Jensen et al. | 260—543 |
| 2,683,169 | 7/54 | Jensen et al. | 260—543 |

OTHER REFERENCES

Saborovskij: C.A., vol. 44, pages 1401–1402 (1950).

LORRAINE A. WEINBERGER, *Primary Examiner.*

LEON ZITVER, *Examiner.*